Patented Oct. 1, 1935

2,016,075

UNITED STATES PATENT OFFICE 2,016,075

ORGANIC HALIDES

Herbert Wilkens Daudt, Wilmington, Del., assignor to E. I. du Pont de Nemours & Company, Wilmington, Del., a corporation of Delaware No Drawing. Application September 8, 1933, Serial No. 688,701

16 Claims. (Cl. 260—162)

This invention relates to alkyl halides containing less than four carbon atoms, more particularly ethyl chloride, and a process for the production thereof.

Ethyl chloride can be made by heating dilute sulfuric acid with sodium chloride and alcohol, the usual procedure being to feed the alcohol slowly and pass the ethyl chloride through a reflux condenser in order to prevent alcohol from escaping unchanged from the reaction vessel. In 1915 Uhlmann described a process of producing ethyl chloride which involved the heating, under a reflux condenser, of a mixture of aqueous hydrochloric acid, ethyl alcohol and zinc chloride or calcium chloride. The zinc chloride or calcium chloride was to function as a catalyst, calcium chloride being the preferred salt. In both of these processes, a relatively long time is required to finish one batch.

According to Wilkie, U. S. Patent 1,478,498, ethyl chloride may be produced by passing hydrochloric acid gas and ethyl alcohol vapor over a catalyst composed of zinc chloride impregnated on a carrier. Backhaus was allowed U. S. Patent No. 1,509,463 for a similar process in which fused zinc chloride was used as a catalyst. The yields of ethyl chloride according to the Wilkie and Backhaus processes are alleged to be as high as 85%.

The previously proposed processes being not all that might be desired for commercial operation, Frei, U. S. Patent No. 1,784,423, proposed a number of other catalysts suitable for the production of ethyl chloride from ethyl alcohol and hydrochloric acid, the catalysts mentioned being combinations of chlorine with metals which lie between chromium and bismuth in the electromotive series. As a further improvement on the art, Frei in U. S. Patent No. 1,824,951 described the production of ethyl chloride by heating together sodium chloride and dilute sulfuric acid, adding ethyl alcohol and without refluxing passing the resultant vapors into a zinc chloride solution from which the water vapor and ethyl chloride were removed practically as rapidly as they were formed.

It is an object of the present invention to provide a new and improved process for producing alkyl halides containing less than four carbon atoms. A further object is to provide a process for manufacturing alkyl halides containing less than four carbon atoms which is an improvement over the processes of Frei and the other investigators above noted. A still further and more specific object is the provision of a new and improved process for the production of ethyl chloride. Other objects will appear hereinafter.

These objects are accomplished by reacting together a hydrohalide acid and a monohydric alkyl alcohol containing less than four carbon atoms in the presence of a bismuth catalyst, at temperatures above the boiling point of the alcohol, and preferably under such conditions that the water and alkyl halide formed by the reaction are removed from the reaction zone.

The invention will be further understood, but is not limited, by the following examples, in which the parts are by weight.

Example I

Substantially 1800 parts of bismuth oxychloride were dissolved in equal weight of 37% aqueous hydrochloric acid. This was concentrated by evaporation until a temperature of 142–148° C. had been obtained. The resultant liquid was placed in a corrosion resistant vessel of such dimensions that the height of the liquid was greater than 18 inches. The temperature was raised to 132°–138° C. and maintained at about this temperature range throughout the operation described below. By means of a long tube provided with one orifice (or more, if desired) and extending to the bottom of the liquid, methyl alcohol was added at the rate of 80 parts per hour and hydrochloric acid gas at the rate of 91.3 parts per hour. The effluent vapors were passed through a water-cooled condenser a caustic soda scrubber and a sulphuric acid scrubber. The methyl chloride vapors obtained were compressed and thereafter condensed by means of a brine-cooled condenser. A yield of approximately 91% was obtained.

Example II

The process described in Example I was carried out using ethyl alcohol instead of methyl alcohol. Yields of 95–98% of the theoretical amount were obtained.

Example III

A catalyst was prepared in the manner described in Example I. While maintaining the catalyst at a temperature of 120–130° C., there were passed into it about 10 parts of hydrochloric acid gas. Thereafter while maintaining the temperature at 130–140° C., there were added isopropyl alcohol at the rate of approximately 60 parts per hour and hydrochloric acid gas at the rate of approximately 40 parts per hour. This operation was continued for ten hours and the vapors condensed by means of two condensers, the first one water-cooled and the second one cooled with ice and water. The condensate was maintained by suitable cooling below a temperature of 15° C. The cold condensate was removed to a tube and agitated with 100 parts of ice water. After discontinuing the agitation, the lower layer was removed. The upper layer was then treated with 50 parts of a 5% aqueous caustic soda solution and the lower aqueous layer again removed. The latter upper layer (isopropyl chloride) was allowed to stand from eight to twenty-four hours with 25 parts of anhydrous calcium chloride. The dried product was removed and, when desired, purified further by distillation.

Example IV

The catalyst was prepared in the manner described in Example I. Its temperature was maintained at 132–138° C. throughout the operation described below. To a brick-lined vessel provided with corrosion resistant heating coils there were added about 400 parts of a fused mixture containing approximately 80% sodium bisulphate, 5% sulphuric acid and 15% water. To this were added 300 parts of small rock salt (NaCl) crystals and the mass heated to 90–95° C. While maintaining the temperature in this range, there was added during the course of two hours a mixture of 200 parts of 92.5% (by weight) ethyl alcohol and 530 parts of 78% sulphuric acid. The temperature was then maintained at 95–100 C. during the addition of 104 parts of 78% sulphuric acid. The time utilized for this step was about three hours. The temperature was then gradually raised during the course of three and one-half to four hours to about 125° C. All of the vapors given off from the above operations were passed through the bismuth catalyst first described. The resulting vapors were scrubbed, dried and condensed.

It should be noted that with the compound (ethyl chloride) produced no compression is required when the cooling is carried out in brine condensers. The operation of this run was considered complete when the formation of ethyl chloride ceased. The completed reaction mass above described was approximately of the composition described for the original mixture. It has been found that for each succeeding run it is desirable to use a portion (usually about one-third to one-fifth) of a completed reaction mass from a previous charge in the place of a fresh sodium bisulphate mixture. Yields of 95–98% ethyl chloride were obtained.

Example V

Lumps of pumice were crushed and graded. The particles whose dimensions were approximately one-eighth to one-fourth inch in diameter were stirred with an excess of a 30% solution of bismuth trichloride in aqueous hydrochloric acid. The excess solution was drained away and the impregnated pumice placed in a quartz tube (glass is also a satisfactory material). Tubes one-half inch in diameter and approximately two and one-half feet long have been found satisfactory. The contents of the tubes were heated to 170–175° C. and a stream of hydrochloric acid gas passed therethrough until the greater part of the moisture present had been volatilized. Thereafter, while maintaining the same temperature, there were passed over the catalyst continuously hydrochloric acid gas at the rate of approximately 60 parts per hour and ethyl alcohol (92.5% by weight) at the rate of approximately 80 parts per hour. The resultant vapors were removed, scrubbed and condensed. The liquid ethyl chloride was collected in a suitable receiver.

Example VI

Activated alumina was impregnated with a 30% solution of bismuth trichloride in aqueous hydrochloric acid. The impregnated alumina was placed in a quartz tube heated to reaction temperature and hydrochloric acid gas and ethyl alcohol vapor were passed through with the following results:

| Reaction Temp. ° C. | Ethyl alcohol cc/min. | Hydrochloric acid excess over equimolecular proportions of alcohol | Ethyl chloride yields % |
|---|---|---|---|
| 174–176 | 1 | 8% | 86.6 |
| 154–156 | 1 | 6–7% | 74.2 |
| 155–158 | 1 | 1% | 72.4 |

The resultant vapors were scrubbed and condensed as previously described.

Instead of an impregnated catalyst, a fused bismuth catalyst, e. g., fused $BiCl_3$ may be used, in which case the operating temperatures are preferably lower, e. g., 120°–140° C.

Other supporting materials, such as, for example, alundum or asbestos, may be used in place of the activated alumina.

Example VII

Hydrogen chloride and ethyl alcohol vapor were passed simultaneously into a catalyst at the rate of about 2.5 moles of each per hour. The approximate composition of the catalyst was:

| | Percent |
|---|---|
| Bismuth trichloride | 76.7 |
| Water | 18.7 |
| Hydrogen chloride | 4.6 |

The temperature of the catalyst was about 125° C. and the pressure atmospheric.

The effluent vapors, composed largely of water and ethyl chloride, were removed directly from the reaction zone without refluxing and the ethyl chloride recovered. A high yield of ethyl chloride was obtained.

As will be apparent from the above description, it is possible to use the hydrogen chloride as a gas or as a solution in water or in alcohol. It is also possible to use the anhydrous hydrogen chloride if desired. It will also be clear that the alcohol will, in certain instances, be used as a liquid and, in other instances, as a vapor either substantially anhydrous or mixed with varying proportions of water.

It will be observed that the character of the catalyst has a marked effect on the operating conditions and the yields obtained. Catalysts of the type described in Examples I and VII above upon cooling are sometimes entirely liquid and at other times mostly solid. The physical state depends upon whether the temperatures used were much below or much above 135° C. When the catalyst has been used at temperatures as high as 135° C., the cooled mass is mostly liquid, there being only a small crust on the surface or a small amount of crystallized material at the bottom. Catalysts which are entirely liquid or partly liquid and partly solid in their normal state but are substantially liquid during the reaction are herein designated as "catalyst solutions" as distinguished from the solid catalysts.

When a catalyst solution is used, the catalyst composition gradually reaches an equilibrium concentration with the water formed during the reaction. If the concentration of water becomes too high, as in the case where temperatures as low as 70° C. are employed or a reflux condenser is used to return practically all of the water in the evolved vapors to the reaction zone, the catalyst becomes enfeebled and the reaction becomes unduly slow. On the other hand, if the concentration of water in the catalyst solution becomes too low the yield of alkyl halide is decreased. In commercial practice, therefore, in order to provide a continuous process it is desirable to carry out the reaction by passing the alcohol and hydrogen halide through the relatively concentrated water solution of the catalyst above the boiling point of water and preferably above 110° C., whereby as soon as the equilibrium concentration is established, the water is removed as fast as formed. Good results may be obtained in the use of catalyst solutions containing about 70% to 90% of bismuth halide, the remainder being water and hydrochloric acid. The amount of hydrochloric acid present in such solutions may be as high as 5%, while zinc chloride solutions of corresponding concentration will not ordinarily take up more than about 1% of hydrogen chloride. If desired, a predetermined water concentration of the catalyst solution may be maintained by adding water to the reaction zone as the reaction proceeds.

The preferred temperatures for carrying out the reaction in the presence of a bismuth catalyst solution vary from about 120° to about 140° C. When using an impregnated catalyst, the reaction temperature is advantageously at least 150° C. and preferably about 170° C. to about 180° C. Higher temperatures, for example as high as 250° C., also result in the formation of the alkyl halides.

It will be understood that when preparing an alkyl chloride, it is not necessary to initially use bismuth trichloride as the catalyst. The basic salt BiOCl may be used advantageously as a starting component. In general, bismuth trichloride may be added per se or as a compound convertible to it by the hydrochloric acid present. The same variations are possible when preparing other halide derivatives. It is not necessary that the acid radical of the bismuth salt be the same as that of the ester desired, but it is preferable that such be the case since then there is no possibility of producing a mixture of esters. For instance, for the preparation of ethyl bromide it would be desirable to use bismuth tribromide as the catalyst.

In catalytic processes, catalysts are known to function in the acceleration of the speed of reactions. One catalyst is especially advantageous over another when it exhibits greater activity in accelerating a given reaction. The greater activity of one catalyst over another is not apparent under all conditions, as for instance, where a high speed of reaction is not involved. In the production of alkyl halides the latter type of process is illustrated by the batch type processes in which the reaction is effected either at temperatures below the boiling point of the alcohol or under reflux in order to prevent the alcohol from escaping unchanged from the reaction vessel. In this type of process the results obtained with the bismuth halide catalyst of the present invention and other metallic halides, such as zinc chloride and calcium chloride, are not substantially different.

The following table will illustrate yields which may be obtained by operating according to the batch type of process:

| Metallic halide | Ethyl chloride yield (percent) |
|---|---|
| BiCl₃ | 90–95 |
| ZnCl₂ | 90–95 |
| CaCl₂ | 93 |

As already indicated, however, the batch type process is very slow and unsuited for commercial production of ethyl chloride. The present invention provides a catalyst which has not heretofore been proposed for the production of ethyl chloride by the batch type process, but it is more particularly concerned with a continuous process for the production of alkyl halides such as ethyl chloride.

The following tables illustrate the advantage of bismuth halide catalysts in the continuous type procedures:

(a) Process of Examples I, II, III and VII
Catalysts=1000 parts.
EtCl production 50 parts per hour.

| Metallic halide | Ethyl chloride yield (percent) |
|---|---|
| BiCl₃ | 95 |
| ZnCl₂ | 88 |
| CaCl₂ | about 10 |

(b) Process of Example IV

| Metallic halide | Ethyl chloride yield (percent) |
|---|---|
| BiCl₃ | 97 |
| ZnCl₂ | 91 |
| CaCl₂ | 60 |
| None | 55 |

It will be apparent from the foregoing discussion that the invention is especially advantageous for the commercial production of ethyl chloride. On a weight basis a catalyst solution of bismuth trichloride is more efficient in the production of ethyl chloride than a catalyst solution of zinc chloride. This may be due in part to the fact that the bismuth trichloride solution is capable of absorbing a larger amount of hydrogen chloride than the zinc chloride solution. The processes involving the use of impregnated catalysts are desirable in that only a small amount of catalyst is required, but the processes in which a catalyst solution is used are more advantageous in that the reaction may be effected at lower temperatures and with higher yields.

Substantially no others are formed in the production of methyl chloride, isopropyl chloride and ethyl chloride according to the present invention. The process is not commercially satisfactory for the production of higher alkyl halides such as butyl chloride, however, on account of ether formation. While the disadvantages of the formation of butyl ether may be overcome to some extent by operating under reflux, as already indicated, such a process is not continuous and not commercially satisfactory. The fact that ethyl chloride may be produced without substantial ether formation while butyl chloride cannot illustrates the unpredictability of catalytic reactions of this character. This is further evidenced by the fact that Uhlmann's preferred calcium chloride catalyst is of practically no value for use in the continuous process of the present invention.

This application is a continuation-in-part of my co-pending application Serial No. 497,838, filed November 24, 1930.

As many apparently widely different embodiments of this invention may be made without departing from the spirit and scope thereof, it is to be understood that I do not limit myself to the specific embodiments thereof except as defined in the appended claims.

I claim:

1. In a process of producing an alkyl halide containing less than four carbon atoms, the step which comprises reacting together a hydrohalide acid and a monohydric alkyl alcohol containing less than four carbon atoms at a temperature above the boiling point of the alcohol, in the presence of a bismuth halide catalyst.

2. In a process of producing an alkyl halide containing less than four carbon atoms, the step which comprises reacting together a hydrohalide acid and a monohydric alkyl alcohol containing less than four carbon atoms, at a temperature above the boiling point of the alcohol in the presence of a fused bismuth halide.

3. In a process of producing an alkyl halide containing less than four carbon atoms, the step which comprises reacting together a hydrohalide acid and a monohydric alkyl alcohol containing less than four carbon atoms, at a temperature above the boiling point of the alcohol in the presence of a solution of a bismuth halide.

4. In a process of producing an alkyl halide containing less than four carbon atoms, the step which comprises reacting together a hydrohalide acid and a monohydric alkyl alcohol containing less than four carbon atoms, at a temperature above the boiling point of the alcohol in the presence of a bismuth halide catalyst carried on a carrier.

5. In a process of producing an alkyl chloride containing less than four carbon atoms, the step which comprises reacting together hydrogen chloride and a monohydric alkyl alcohol containing less than four carbon atoms, at a temperature above the boiling point of the alcohol in the presence of a bismuth chloride catalyst, and removing the evolved vapors from the reaction zone.

6. In a process of producing an alkyl chloride containing less than four carbon atoms, the steps which comprise reacting together hydrogen chloride and an alkyl alcohol containing less than four carbon atoms in the presence of an aqueous solution of a bismuth chloride catalyst maintained at a temperature above 110° C., and continuously removing the evolved vapors from the reaction zone.

7. In a process of producing an alkyl chloride containing less than four carbon atoms, the steps which comprises heating together an alkali metal chloride, sulphuric acid and a monohyric alkyl alcohol containing less than four carbon atoms to form a vapor mixture containing an alkyl chloride, the alcohol, hydrogen chloride and water and bringing said vapor mixture into contact with a bismuth chloride catalyst maintained at a temperature above the boiling point of the alcohol.

8. In a process of producing ethyl chloride, the step which comprises reacting together hydrochloric acid and ethyl alcohol at a temperature above the boiling point of the alcohol, in the presence of a bismuth chloride catalyst.

9. In a continuous process for producing ethyl chloride, the steps which comprise reacting together hydrochloric acid and ethyl alcohol in the presence of a bismuth chloride catalyst maintained at a temperature above about 110° C., and continuously removing the evolved vapors from the reaction zone.

10. In a process of producing ethyl chloride, the steps which comprise reacting together hydrochloric acid and ethyl alcohol in the presence of an aqueous solution of a bismuth chloride maintained at a temperature above about 110° C., and continuously removing from the reaction zone the water formed during the reaction and the evolved ethyl chloride.

11. In a process of producing ethyl chloride, the steps which comprise simultaneously bringing together hydrogen chloride and ethyl alcohol in the presence of an aqueous solution of a bismuth chloride maintained at a temperature of about 120° to 140° C., and continuously removing from the reaction zone the water vapor and ethyl chloride formed during the reaction.

12. In a process of producing ethyl chloride, the steps which comprise reacting together hydrogen chloride and ethyl alcohol at a temperature above the boiling point of the alcohol in the presence of a catalyst solution containing about 70% to about 90% of a bismuth chloride, the remainder being substantially water and hydrogen chloride.

13. In a process of producing ethyl chloride, the step which comprises reacting together hydrogen chloride and ethyl alcohol in the presence of a catalyst solution containing about 70% to about 90% of a bismuth chloride, the remainder being substantially water and hydrogen chloride, maintaining said solution at a temperature above about 110° C., and continuously removing from the reaction zone the evolved vapors.

14. In a process of producing ethyl chloride, the steps which comprise passing gaseous hydrogen chloride and ethyl alcohol vapor over a solid bismuth chloride catalyst carried on a carrier, maintaining said catalyst at a temperature of about 170° to about 180° C., and continuously removing from the reaction zone the water and the formed ethyl chloride.

15. In a process of producing ethyl chloride, the steps which comprise heating together an alkali metal chloride, sulphuric acid and ethyl alcohol to form a vapor mixture containing ethyl chloride, ethyl alcohol, hydrogen chloride and water, and bringing said vapor mixture into contact with a bismuth chloride catalyst solution maintained at a temperature above about 110° C.

16. In a process of producing an alkyl halide containing less than four carbon atoms, the step which comprises reacting together a hydrohalide acid and a monohydric alkyl alcohol containing less than four carbon atoms at a temperature above the boiling point of the alcohol in the presence of a bismuth halide catalyst that is maintained in a liquid state.

HERBERT WILKENS DAUDT.